United States Patent
Davis et al.

(10) Patent No.: US 10,318,854 B2
(45) Date of Patent: Jun. 11, 2019

(54) SYSTEMS AND METHODS FOR PROTECTING SENSITIVE INFORMATION STORED ON A MOBILE DEVICE

(71) Applicant: Assa Abloy AB, Stockholm (SE)

(72) Inventors: Masha Leah Davis, Austin, TX (US); Horst Arnold Mueller, Rio Rancho, NM (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/154,159

(22) Filed: May 13, 2016

(65) Prior Publication Data

US 2016/0335530 A1 Nov. 17, 2016

Related U.S. Application Data

(60) Provisional application No. 62/161,127, filed on May 13, 2015.

(51) Int. Cl.

| | |
|---|---|
| H04N 7/18 | (2006.01) |
| H04W 4/38 | (2018.01) |
| G06K 19/07 | (2006.01) |
| H04L 29/06 | (2006.01) |
| H04M 1/725 | (2006.01) |
| H04W 12/06 | (2009.01) |
| H04W 12/08 | (2009.01) |

(52) U.S. Cl.
CPC ...... *G06K 19/0727* (2013.01); *H04L 63/0853* (2013.01); *H04L 63/10* (2013.01); *H04M 1/7253* (2013.01); *H04M 1/72569* (2013.01); *H04N 7/185* (2013.01); *H04W 12/06* (2013.01); *H04W 12/08* (2013.01); *H04W 4/38* (2018.02)

(58) Field of Classification Search
CPC ............... H04L 63/0853; H04L 63/10; H04M 1/72569; H04M 1/7253; H04N 7/185; H04W 12/06; H04W 12/08; H04W 4/38; G06K 19/0727
USPC .... 455/404.2, 412.1–414.2, 418–420, 422.1, 455/41.1–41.2, 552.1, 558, 456.1, 456.2, 455/457, 410–411; 380/24, 23, 228, 247; 726/6, 9, 20, 3, 2; 713/185, 186
See application file for complete search history.

(56) References Cited

U.S. PATENT DOCUMENTS

| | | | | |
|---|---|---|---|---|
| 7,197,767 | B2 * | 3/2007 | Kusakabe | G06Q 20/045 726/20 |
| 7,376,839 | B2 * | 5/2008 | Carta | G07C 9/00039 713/185 |

(Continued)

FOREIGN PATENT DOCUMENTS

| | | |
|---|---|---|
| EP | 2521342 | 11/2012 |

OTHER PUBLICATIONS

Extended Search Report for European Patent Application No. 16169588.7, dated Sep. 23, 2016 8 pages.

(Continued)

*Primary Examiner* — Babar Sarwar
(74) *Attorney, Agent, or Firm* — Schwegman Lundberg & Woessner, P.A.

(57) ABSTRACT

A method and device for protecting sensitive information stored on a mobile device capable of wireless communication is described. The protection is provided by permitting wireless transmission of the sensitive information only if data received from an optical sensor or a magnetic sensor satisfies a predetermined requirement.

20 Claims, 9 Drawing Sheets

(56) References Cited

U.S. PATENT DOCUMENTS

| | | | | |
|---|---|---|---|---|
| 7,600,129 B2* | 10/2009 | Libin | | H04L 9/00 380/278 |
| 7,706,778 B2* | 4/2010 | Lowe | | H04L 63/062 455/411 |
| 8,074,271 B2* | 12/2011 | Davis | | G06F 21/31 726/16 |
| 8,606,317 B2 | 12/2013 | Ahmad Athsani et al. | | |
| 8,627,438 B1* | 1/2014 | Bhimanaik | | H04L 63/10 726/9 |
| 8,662,401 B2* | 3/2014 | Skowronek | | G06Q 20/10 235/380 |
| 9,020,430 B2* | 4/2015 | Sinivaara | | H04B 5/00 455/41.2 |
| 9,165,320 B1* | 10/2015 | Belvin | | G06Q 30/0633 |
| 9,336,637 B2 | 5/2016 | Neil et al. | | |
| 9,363,155 B1* | 6/2016 | Gravino | | G06Q 30/02 |
| 2005/0165667 A1* | 7/2005 | Cox | | G06Q 20/10 705/35 |
| 2006/0079180 A1* | 4/2006 | Sinivaara | | H04B 5/00 455/41.2 |
| 2006/0149635 A1* | 7/2006 | Bhatti | | G06Q 10/08 705/23 |
| 2008/0085001 A1* | 4/2008 | Charrat | | H04L 9/3273 380/247 |
| 2008/0116278 A1* | 5/2008 | Epshteyn | | H04L 65/4061 235/462.25 |
| 2009/0319428 A1* | 12/2009 | Febonio | | G06Q 20/20 705/44 |
| 2010/0115591 A1* | 5/2010 | Kane-Esrig | | G06F 21/34 726/5 |
| 2010/0281261 A1* | 11/2010 | Razzell | | H04L 63/0492 713/171 |
| 2011/0061100 A1 | 3/2011 | Mattila et al. | | |
| 2011/0149802 A1* | 6/2011 | Fok Ah Chuen | | H04W 12/08 370/254 |
| 2011/0270751 A1* | 11/2011 | Csinger | | G06F 21/40 705/42 |
| 2012/0081282 A1* | 4/2012 | Chin | | G06F 3/011 345/156 |
| 2012/0284427 A1* | 11/2012 | Dods | | H04W 88/00 710/3 |
| 2012/0321112 A1* | 12/2012 | Schubert | | H04R 25/43 381/312 |
| 2014/0171856 A1* | 6/2014 | McLaughlin | | A61M 5/1723 604/66 |
| 2014/0298434 A1 | 10/2014 | Prchal | | |
| 2014/0342667 A1 | 11/2014 | Aarnio | | |
| 2014/0342670 A1* | 11/2014 | Kang | | H04W 24/08 455/41.2 |
| 2014/0373117 A1* | 12/2014 | Le Saint | | G06F 21/33 726/6 |
| 2014/0375421 A1* | 12/2014 | Morrison | | G07C 9/00571 340/5.61 |
| 2015/0082329 A1* | 3/2015 | Qu | | H04N 21/6334 725/5 |
| 2015/0229627 A1* | 8/2015 | Yasuma | | H04L 63/08 726/4 |
| 2016/0180368 A1* | 6/2016 | Booth | | G06Q 30/0226 705/14.27 |
| 2016/0188919 A1* | 6/2016 | Gao | | G06K 19/0709 340/10.34 |
| 2016/0210747 A1* | 7/2016 | Hay | | G06F 16/7335 |
| 2016/0227348 A1* | 8/2016 | Guo | | H04L 9/3278 |
| 2016/0232480 A1* | 8/2016 | Erez | | G06Q 10/087 |
| 2016/0322853 A1* | 11/2016 | Porat | | H02J 50/12 |
| 2016/0335530 A1* | 11/2016 | Davis | | G06K 19/0727 |

OTHER PUBLICATIONS

Official Action for European Patent Application No. 16169588.7, dated Nov. 14, 2017 5 pages.
Intention to Grant for European Patent Application No. 16169588.7, dated Jul. 18, 2018 52 pages.

* cited by examiner

SYSTEMS AND METHODS FOR PROTECTING SENSITIVE INFORMATION STORED ON A MOBILE DEVICE

CROSS REFERENCE TO RELATED APPLICATIONS

Pursuant to 35 U.S.C. § 119(e), the present application claims the benefit of and priority to U.S. Provisional Application Ser. No. 62/161,127, filed on May 13, 2015, entitled "Systems and Methods for Protecting Sensitive Information Stored on a Mobile Device," the entire disclosure of which is hereby incorporated by reference, in its entirety, for all that it teaches and for all purposes.

FIELD

The present disclosure is generally directed to access control systems and more specifically to devices that are configured to provide access information to access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

One example of a portable device includes the radio frequency identification (RFID) device, such as a contactless smart card, key fob, or the like, to store credential information that can be used to gain access to an asset. When presented to a reader/interrogator, the smart card transmits the stored credential information for verification by the reader/interrogator. The reader/interrogator processes the credential information and determines if the smart card being presented is a valid smart card. If the reader/interrogator determines that credential information associated with the smart card is valid, then the reader/interrogator initiates any number of actions including allowing the holder of the smart card access to an asset protected thereby.

Another example of a portable device can include a wireless mobile device, such as a communication device, mobile phone, smartphone, etc. In this case, credential information may be stored in a memory associated with the mobile device and communicated to a reading device using at least one wireless communication protocol available to the mobile phone.

SUMMARY

As access control technology continually progresses, devices and communication protocols evolve to offer more security, portability, and interoperability. However, the benefits of this evolution may be thwarted by increasing instances of identity theft, stolen credentials, and/or other access control device theft. It is with respect to these issues and other problems that the embodiments presented herein were contemplated.

The proliferation of smart phones, tablets, wearable computing devices, and other mobile devices, many of which are capable of wireless communication, has led to the increasing use of these devices to store sensitive information, including personal financial information (e.g. credit card numbers, bank account information, etc.), access credentials (e.g. for gaining entry to homes, offices, and other controlled access facilities, as well as for logging into websites, databases, and other electronic resources), business information (e.g. competitively sensitive emails, data, etc.) and so forth. By storing such information on a mobile device, the information is readily available whenever it needs to be transmitted to a trusted recipient device. Such transmission is facilitated by the wireless communication hardware on the mobile device. This same wireless communication capability, however, may render the mobile device susceptible to unauthorized, and in certain cases undetected, access. For example, data thieves may be able to utilize wireless communications to cause a mobile device containing sensitive information to transmit the sensitive information over a wireless connection, such that it can be copied and saved for later, illicit use, without alerting the user of the mobile device.

Access credentials stored on dedicated smart cards benefit from inherent security features that are not present in mobile devices. When the smart card is positioned in close proximity to a smart card reader, inductive coupling is used to power the smart card such that the access credentials can be transmitted to the reader using Radio Frequency Identification (RFID) or some other form of Near-Field Communication (NFC). The reader then determines whether the credentials are valid and, if so, permits access. Thus, credentials stored in a smart card are substantially secure because they cannot be accessed without powering the smart card, which in turn requires that the smart card be close enough to a reader to allow inductive coupling, which in turn is unlikely to occur without the user's knowledge or permission.

Now, however, user credentials for access control systems are increasingly being stored on multi-purpose mobile devices (e.g. smart phones) equipped for long-distance (e.g. outside of NFC range) wireless communication, and access control systems themselves increasingly use non-NFC communication protocols (e.g. Bluetooth®, Bluetooth® low energy (BLE), WiFi, ZigBee, etc.). As a result, credentials stored in such devices do not enjoy the inherent security resulting from the proximity requirement of NFC communication protocols. Consequently, they are more susceptible to theft over a wireless connection, which may be undetectable to the holder of the credentials.

In access control systems specifically and in communications systems generally, then, there is a growing need to protect sensitive information from illicit access. The present disclosure describes certain solutions to this problem, using optical and/or magnetic parameters to increase the security of credentials or other sensitive information stored on a mobile device.

In some embodiments of the present disclosure, a mobile device is configured to transmit sensitive information stored thereon only when an optical sensor on the mobile device (e.g. a camera) is used to detect a predetermined motion or sequence of motions.

In some embodiments of the present disclosure, a mobile device is configured to transmit sensitive information stored thereon only when an optical sensor on the mobile device (e.g. a camera) is used to detect a trusted image.

In some embodiments of the present disclosure, a mobile device is configured to determine the proximity to a trusted recipient device using an optical sensor (e.g. a camera) or a magnetic sensor (e.g. a magnetometer), and is further configured to transmit sensitive information stored thereon only when a trusted device is within a predetermined proximity.

In some embodiments of the present disclosure, a mobile device is configured to transmit sensitive information stored thereon only when a magnetic sensor on the mobile device (e.g. a magnetometer) is used to detect a predetermined motion or sequence of motions.

In some embodiments of the present disclosure, a mobile device is configured to transmit sensitive information stored thereon only when a magnetic sensor on the mobile device (e.g. a magnetometer) is used to detect a trusted magnetic field.

The above-described embodiments and configurations are neither complete nor exhaustive. As will be appreciated, other embodiments of the invention are possible using, alone or in combination, one or more of the features set forth above or described in detail below.

As used herein, an access control system is a system comprising a reader configured to control access to a protected resource at a given access point, such as a door or gate, and further comprising one or more credential devices (e.g., an RFID tag, a mobile device, etc.) configured to communicate with the reader. A mobile device may be a smartphone, a tablet, or any other device comprising a processor, a data storage capability (e.g., computer memory), and a wireless communication capability. The terms identification code, electronic key, and mobile key are used interchangeably herein, and refer to the access credentials needed for a user to gain access to an access control system. Sensitive information refers to any information that, if disclosed, could result in physical, financial, reputational, or any other form of harm to an individual, a company or other organization, or to the property of an individual, company, or other organization, and includes, without limitation, personal financial information (e.g. credit card numbers, bank account information, etc.), access credentials (e.g. for gaining entry to homes, offices, and other controlled access facilities, as well as for logging into websites, databases, and other electronic resources), and business information (e.g. competitively sensitive emails, data, etc.) A user is an individual in possession of a mobile device that has stored thereon an authorized identification code and/or other sensitive information and that is configured to wirelessly communicate with the reader of an access control system. A reader or reading device or interrogator is a device having a location (which may or may not be fixed) near an access point to a protected resource, and that is configured to grant access to the protected resource, for example, upon receipt of authorized access credentials from a mobile device. A reader may comprise a contact-based or contactless communication interface (also referred to herein as a wireless communication interface, which may include one or both of a wireless communication receiver and a wireless communication transmitter, or a wireless communication transceiver), a memory for storing at least instructions, and a processor for carrying out instructions stored in memory. Alternatively or additionally, the instructions may be stored as firmware.

Any number of communications protocols may be employed by a mobile device. Examples of communications protocols can include, but are in no way limited to, the protocol or protocols associated with near field communication (NFC), radio frequency identification (RFID) (e.g., operating at 125 kHz, 13.56 kHz, etc.), Bluetooth® wireless communication, Bluetooth® Low Energy (BLE), Personal Area Network (PAN), Body Area Network (BAN), cellular communications, WiFi communications, and/or other wireless communications.

In addition to the transfer of access credentials or other sensitive information from a mobile device to a reader, information from one or more components of a mobile device may also be gathered and used by an access control system (e.g. through an access control system reader). This information may include, but is in no way limited to, temperature data, barometric pressure data, biometric data (e.g. heart rate, breathing rate, etc.), altimeter and/or altitude data, audible data (e.g. detecting similar sounds in an area around each device and comparing the detected sounds and/or sound profiles to one another determine whether continuous authentication is allowed, where matching audible data allows authentication and where nonmatching audible data disables authentication, etc.), light data (e.g. detecting similar light radiation in an area around each device and comparing the light detected at each device to determine whether continuous authentication is allowed, etc.), magnetic radiation data, other energy data, combinations thereof, and/or the like.

The terms "memory," "computer memory," "computer-readable medium," and "computer-readable storage medium," as used herein, refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credentials," "access credentials," or "credential information" refer to any data, set of data, encryption scheme, key, and/or transmission protocol carried by a particular device (e.g., a "credential device," a "mobile device," or a "wearable device") to authenticate and/or to verify its authenticity or access authorization with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

Figure 1:
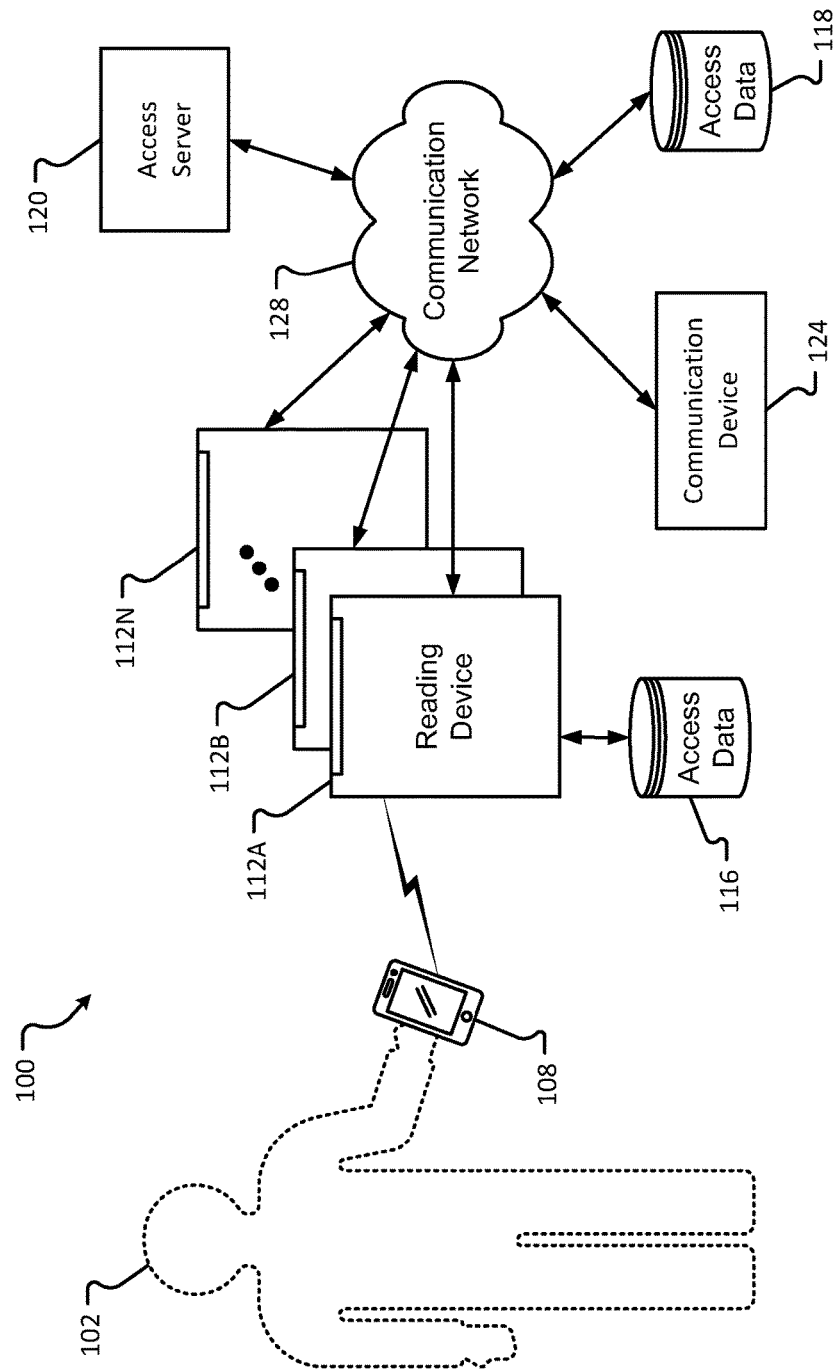
FIG. 1 is a diagram depicting an access control system in accordance with embodiments of the present disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

According to one embodiment of the present disclosure, a method for authorizing wireless communications from a mobile device comprises: receiving at a processor, from at least one of a camera and a magnetic sensor on a mobile device, a signal corresponding to a sensed environment of the mobile device; analyzing the signal, with a processor, to generate data relevant to a predetermined requirement; determining, with the processor and based on the data, whether the predetermined requirement has been satisfied; and selectively transmitting, based on the determination, sensitive information from the mobile device using a wireless communication protocol.

In the foregoing method, the analyzing may comprise generating light pattern data about a pattern of lights detected by the camera, and the determining may comprise comparing the light pattern data with information about a trusted pattern of lights. Additionally, the information about the trusted pattern of lights may be stored in a memory of the mobile device. The signal may correspond to an image taken by the camera, and the analyzing may comprise generating object data about an object in the image. The determining may comprise determining whether the object data corresponds to object information about a trusted object associated with a trusted recipient device, and the object information may be stored in a memory of the mobile device. Further, the object data may comprise a first distance datum about a distance from the camera to the object, and the determining may comprise comparing the first distance datum with distance information stored in a memory of the mobile device.

Also in the foregoing method, the signal may correspond to a sensed magnetic field, the analyzing may comprise generating magnetic field data about the sensed magnetic field, and the determining may comprise comparing the magnetic field data with magnetic field information stored in a memory of the mobile device. The magnetic field data may comprise information about one of a strength and a direction of the sensed magnetic field. Alternatively or additionally, the magnetic field data may comprise a distance between the magnetic sensor and a source of the magnetic field.

According to another embodiment of the present disclosure, a wireless communication device comprises a wireless communication radio; a camera or a magnetic sensor; a processor; and a memory containing sensitive information and instructions execution by the processor. The instructions, when executed by the processor, cause the processor to: obtain data from the camera or the magnetic sensor; determine whether the data satisfies a predetermined requirement; and allow transmission of the sensitive information, using the wireless communication radio, if the data satisfies the predetermined requirement.

The data may correspond to at least one of an image captured by the camera or a magnetic field detected by the magnetic sensor. Additionally or alternatively, the data may correspond to a motion or sequence of motions, and the determining may comprise determining whether the motion or sequence of motions corresponds to a predetermined motion or sequence of motions. The data may correspond to an image captured by the camera, and the determining may comprise determining whether an object in the image has one or more features of a trusted recipient device. The information about the one or more features of the trusted recipient device may be stored in the memory. The one or more features of a trusted recipient device may include at least one of a logo, a pattern of lights, a bar code, a shape, a character, and a sequence of characters.

The determining whether the data satisfies a predetermined requirement may comprise determining a distance between the object in the image and the camera. The data may correspond to a plurality of images captured by the camera, and the determining may comprise identifying a movement of the wireless communication device relative to an object in the plurality of images. The data may correspond to a sensed magnetic field, the determining may comprise determining from the data whether the magnetic field has one or more features of a known magnetic field, and the information about the one or more features of the known magnetic field may be stored in the memory.

Also, the data may correspond to a sensed magnetic field, and the determining may comprise determining from the data a distance between the magnetic sensor and a source of the sensed magnetic field.

According to yet another embodiment of the present disclosure, a system, comprises: a processor; a video camera; and a memory, the memory storing instructions for execution by the processor that, when executed by the processor, cause the processor to: identify an object in a video feed from the video camera; detect a motion or sequence of motions of the video camera relative to the object; evaluate whether the motion or sequence of motions of the video camera correspond to a predetermined motion or sequence of motions based on information about the predetermined motion or sequence of motions stored in the memory; and selectively transmit, via a wireless communication radio and based on the evaluating, sensitive information stored in the memory. The identifying may occur without user input. Additionally, the predetermined motion or sequence of motions may comprise a motion in a single plane.

Before any embodiments of the disclosure are explained in greater detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

One advantage of mobile devices as credential devices, as opposed to, for example, RFID tags, is that mobile devices are generally capable of beyond-near-field communications using communication protocols such as Bluetooth, BLE, WiFi, ZigBee, infrared, sound, light, etc. In access control systems comprising a reader configured to communicate with a mobile device using one or more such communication protocols, the mobile device can communicate information to the reader even when it is not in close proximity to (e.g., when it is more than 1.0 m away from) the reader. As described herein, however, these advantages may be exploited to gain unauthorized or illicit access to access credentials or other sensitive information stored on a mobile device.

FIG. 1 is a diagram depicting an access control system 100 for authenticating a user 102 using a mobile device 108, in which embodiments of the present disclosure may be implemented. In one embodiment, the access control system 100 comprises at least one reading device 112 and at least one portable/mobile device 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 116 across a communication network 128. The access data memory 116 may be located remotely, locally, and/or locally and remotely, from the reading device 112.

The mobile device 108 may be configured to communicate with a reading device 112 across one or more wireless communication connections. These one or more wireless communication connections can include communications via at least one of conventional radio protocols, proximity-based wireless communication protocols, Bluetooth, BLE, infrared, audible, NFC, RF, and other wireless communication networks and/or protocols. In some cases, communications between the mobile device 108 and the reading device 112 may be established automatically when the mobile device 108 enters an active zone of an interrogating reading device 112. In one embodiment, the active zone of the reading device 112 may be defined as a three-dimensional space where the intensity of RF signals emitted by the reading device 112 exceeds a threshold of sensitivity of the mobile device 108 and the intensity of RF signals emitted by the mobile device 108 exceeds a threshold of sensitivity of the reading device 112.

In some embodiments, the mobile device 108 may be configured to communicate with a reading device 112 across a communication network 128. The communication network 128 can include communication via at least one of conventional radio networks, wireless communication networks, Zig-Bee, GSM, CDMA, WiFi, and/or using other communication networks and/or protocols as provided or described herein.

In one embodiment, authentication may be required between the mobile device 108 and the reading device 112 before further communications are enabled. The further communications may include communications in which access control information (e.g., keys, codes, credentials, etc.) or sensitive information is shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the mobile device 108. This access control information may be used to validate the mobile device 108 to the reading device 112. Validation may include referring to information stored in access data memory 118 or some other memory associated with the mobile device 108. Typically, a reading device 112 is associated with a particular physical or logical asset (e.g., a door protecting access to a secure room, a computer lock protecting sensitive information or computer files, a lock on a safe, and the like). In one embodiment, the mobile device 108 may be validated via one or more components of the access control system 100. Once the mobile device 108 is authenticated, credential information associated with the mobile device 108 may be validated. During this process, the reading device 112 may generate signals facilitating execution of the results of interrogating the mobile device 108 (e.g., signals that engage/disengage a locking mechanism, allow/disallow movement of a monitored article, temporarily disable the reading device 112, activate an alarm system, provide access to a computer system, provide access to a particular document, and the like). Alternatively, the access server 120 or some other system backend component may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 118. Like the memory of the access server 120, the access data memory 118 may comprise a solid state memory or device. The access data memory 118 may comprise a hard disk drive or other random access memory.

In some embodiments, the reading device 112 may be configured to communicate with one or more devices across a communication network 128. For example, the reading device 112 may communicate with a wearable device 104 and/or a mobile device 108 across the communication network 128. Among other things, this communication can allow for back-end authentication and/or provide notifications from the reading device 112 to the mobile device 108. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the mobile device 108 via the reading device 112 or intended for the reading device 112.

Figure 2:
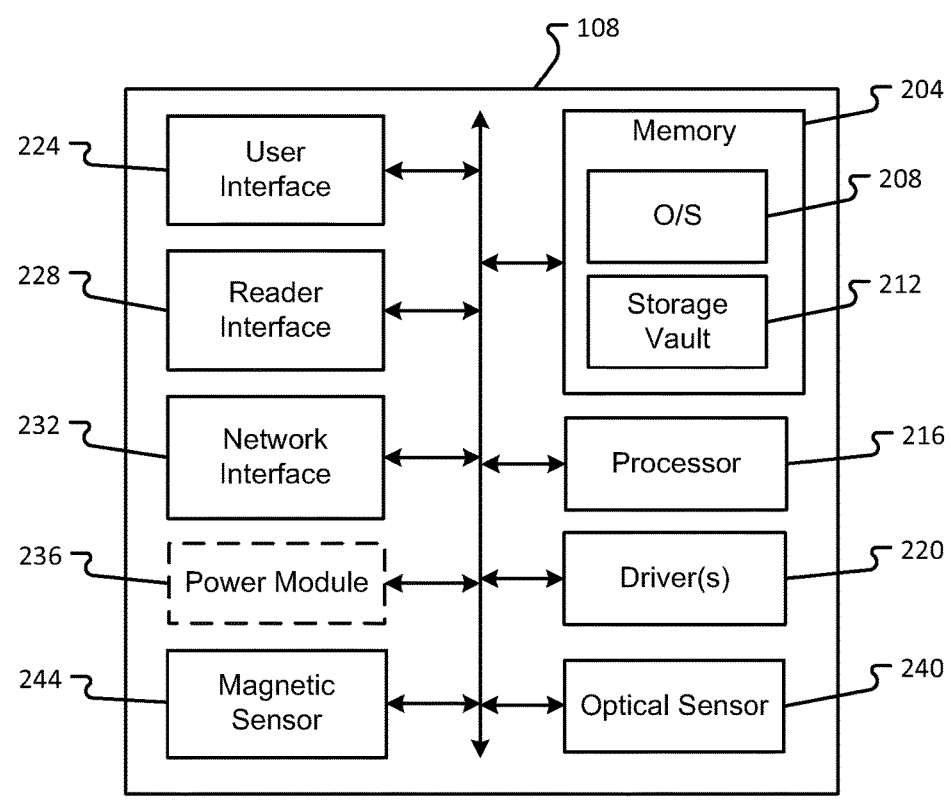
FIG. 2 is a block diagram depicting a mobile device or components thereof in accordance with embodiments of the present disclosure.

FIG. 2 shows a block diagram depicting a mobile device 108 in accordance with embodiments of the present disclosure. The mobile device 108 may correspond to any type of electronic device and, as the name suggests, the electronic device may be portable in nature. As some examples, the mobile device 108 may correspond to a cellular phone or smartphone carried by a user. Other examples of a mobile device 108 include, without limitation, wearable devices (e.g., glasses, watches, shoes, clothes, jewelry, wristbands, stickers, etc.). The mobile device 108 of FIGS. 1 and 2, may be provided with a storage vault 212 that stores one or a plurality of mobile keys and/or other sensitive information. The key(s) and/or other sensitive information may be communicated to a reader 112 in connection with a holder of the mobile device 108 attempting to gain access to an asset protected by the reader 112. As an example, the mobile device 108 may be presented to the reader 112 by a user 102 or holder of the mobile device 108.

If NFC is being used for the communication channel, then the reader 112 and mobile device 108 may have their interfaces/antennas inductively coupled to one another at which point the reader and/or mobile device 108 will authenticate or mutually authenticate with one another. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. It should be appreciated that the mobile device 108 may alternatively or additionally be configured to analyze information received from the reader 112 in connection with making an access control decision and/or in connection with making a decision whether or not to provide key(s) to the reader 112. Examples of technologies that can be used by the mobile device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If BLE or some other non-inductive protocol (e.g., Wi-Fi) is being used for the communication channel, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. If a positive access control decision is made (e.g. if it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The mobile device 108 is shown to include computer memory 204 that stores one or more Operating Systems (O/S) 208 and a storage vault 212, among other items. The mobile device 108 is also shown to include a processor 216, one or more drivers 220, a user interface 224, a reader interface 228, a network interface 232, a power module 236, an optical sensor 240, and a magnetic sensor 244. Suitable examples of a mobile device 108 include, without limitation, smart phones, PDAs, laptops, PCs, tablets, netbooks, wearable devices, and the like.

The memory 204 may correspond to any type of non-transitory computer-readable medium. In some embodiments, the memory 204 may comprise volatile or non-volatile memory and a controller for the same. Non-limiting examples of memory 204 that may be utilized in the mobile device 108 include RAM, ROM, buffer memory, flash memory, solid-state memory, or variants thereof.

The O/S 208 may correspond to one or multiple operating systems. The nature of the O/S 208 may depend upon the hardware of the mobile device 108 and the form factor of the mobile device 108. The O/S 208 may be viewed as an application stored in memory 204 that is processor-executable. The O/S 208 is a particular type of general-purpose application that enables other applications stored in memory 204 (e.g., a browser, an email application, an SMS application, etc.) to leverage the various hardware components and driver(s) 220 of the mobile device 108. In some embodiments, the O/S 208 may comprise one or more APIs that facilitate an application's interaction with certain hardware components of the mobile device 108. Furthermore, the O/S 208 may provide a mechanism for viewing and accessing the various applications stored in memory 204 and other data stored in memory 204.

The processor 216 may correspond to one or many microprocessors that are contained within the housing of the mobile device 108 with the memory 204. In some embodiments, the processor 216 incorporates the functions of the user device's Central Processing Unit (CPU) on a single Integrated Circuit (IC) or a few IC chips. The processor 216 may be a multipurpose, programmable device that accepts digital data as input, processes the digital data according to instructions stored in its internal memory, and provides results as output. The processor 216 implements sequential digital logic as it has internal memory. As with most known microprocessors, the processor 216 may operate on numbers and symbols represented in the binary numeral system.

The driver(s) 220 may correspond to hardware, software, and/or controllers that provide specific instructions to hardware components of the mobile device 108, thereby facilitating their operation. For instance, the user interface 224, reader interface 228, and network interface 232, may each have a dedicated driver 220 that provides appropriate control signals to effect their operation. The driver(s) 220 may also comprise the software or logic circuits that ensure the various hardware components are controlled appropriately and in accordance with desired protocols. For instance, the driver 220 of the reader interface 228 may be adapted to ensure that the reader interface 228 follows the appropriate proximity-based protocols (e.g., BLE, NFC, Infrared, Ultrasonic, IEEE 802.11N, etc.) such that the reader interface 228 can exchange communications with the reader. Likewise, the driver 220 of the network interface 232 may be adapted to ensure that the network interface 232 follows the appropriate network communication protocols (e.g., TCP/IP (at one or more layers in the OSI model), UDP, RTP, GSM, LTE, Wi-Fi, etc.) such that the network interface 232 can exchange communications via the communication network 128. As can be appreciated, the driver(s) 220 may also be configured to control wired hardware components (e.g., a USB driver, an Ethernet driver, etc.).

As mentioned above, the user interface 224 may comprise one or more user input devices and/or one or more user output devices. Examples of suitable user input devices that may be included in the user interface 224 include, without limitation, buttons, keyboards, mouse, touch-sensitive surfaces, pen, camera, microphone, etc. Examples of suitable user output devices that may be included in the user interface 224 include, without limitation, display screens, touchscreens, lights, speakers, etc. It should be appreciated that the user interface 224 may also include a combined user input and user output device, such as a touch-sensitive display or the like.

The reader interface 228 may correspond to the hardware that facilitates communications with the credential for the mobile device 108. The reader interface 228 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 228 is specifically provided to facilitate proximity-based communications with a credential via a communication channel or multiple communication channels.

The network interface 232 may comprise hardware that facilitates communications with other communication devices over the communication network 128. As mentioned above, the network interface 232 may include an Ethernet port, a Wi-Fi card, a Network Interface Card (NIC), a cellular interface (e.g., antenna, filters, and associated circuitry), or the like. The network interface 232 may be configured to facilitate a connection between the mobile device 108 and the communication network 128 and may further be configured to encode and decode communications (e.g., packets) according to a protocol utilized by the communication network 128.

The power module 236 may include a built-in power supply (e.g., battery) and/or a power converter that facilitates the conversion of externally-supplied AC power into DC power that is used to power the various components of the mobile device 108. In some embodiments, the power module 236 may also include some implementation of surge protection circuitry to protect the components of the mobile device 108 from power surges.

The optical sensor 240 may be or include a camera, an infrared sensor, or any other suitable light or optical sensor. As described in further detail herein, the optical sensor 240 may be used to obtain information used to determine whether to release access credentials or other sensitive information from the storage vault 212. Such information may be or include, without limitation, information about the optical or lighting environment of the mobile device 108 and/or about the proximity of the mobile device 108 to a reader 112.

The magnetic sensor 244 may be or include any type of magnetometer suitable for inclusion in a mobile device. As with the optical sensor 240 and as described in further detail herein, the magnetic sensor 244 may be used to obtain information used to determine whether to release access credentials or other sensitive information from the storage vault 212. Such information may be or include, without limitation, information about the magnetic environment of the mobile device 108 and/or about the proximity of the mobile device 108 to a reader 112.

In some embodiments of the present disclosure, a mobile device 108 is configured to transmit sensitive information stored thereon only when an optical sensor 240 on the mobile device 108 (e.g. a camera) is used to detect a predetermined motion or sequence of motions. Also in some embodiments of the present disclosure, a mobile device 108 is configured to transmit sensitive information stored thereon only when an optical sensor 240 on the mobile device 108 (e.g. a camera) is used to detect a trusted object or image.

In some embodiments of the present disclosure, a mobile device 108 is configured to determine the proximity to a trusted recipient device (which may be, for example and without limitation, a reader 112, another mobile device, or a computing device (e.g. a desktop, laptop, server, or the like)) using an optical sensor 240 (e.g. a camera) or a magnetic sensor 244 (e.g. a magnetometer), and is further configured to transmit sensitive information stored in a storage vault 212 of the mobile device 108 only when a trusted device is within a predetermined proximity.

In some embodiments of the present disclosure, a mobile device 108 is configured to transmit sensitive information stored thereon (e.g. in a storage vault 212 of the memory 204 of the mobile device 108, or in anywhere in a memory 204 of the mobile device 108) only when a magnetic sensor 244 on the mobile device 108 (e.g. a magnetometer) is used to detect a predetermined motion or sequence of motions. Also in some embodiments of the present disclosure, a mobile device 108 is configured to transmit sensitive information stored thereon only when a magnetic sensor 244 on the mobile device 108 (e.g. a magnetometer) is used to detect a trusted magnetic field. A trusted magnetic field may be, for example, a magnetic field that matches certain parameters stored in a memory 204 of the mobile device 108.

Figure 3:
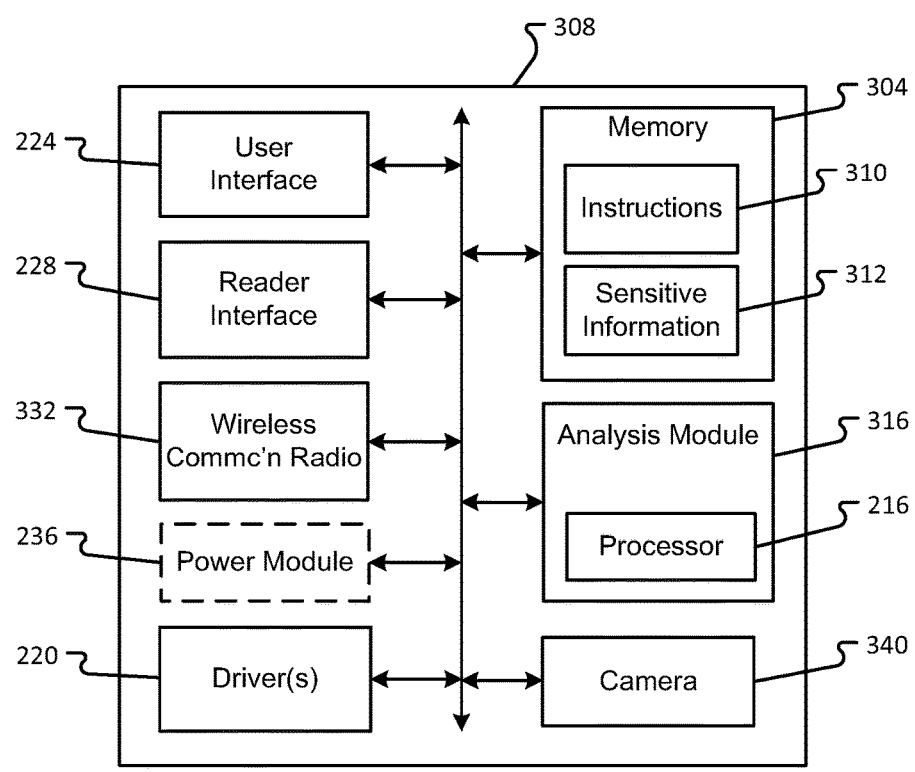
FIG. 3 is a block diagram depicting a mobile device or components thereof in accordance with another embodiment of the present disclosure.
Figure 4:
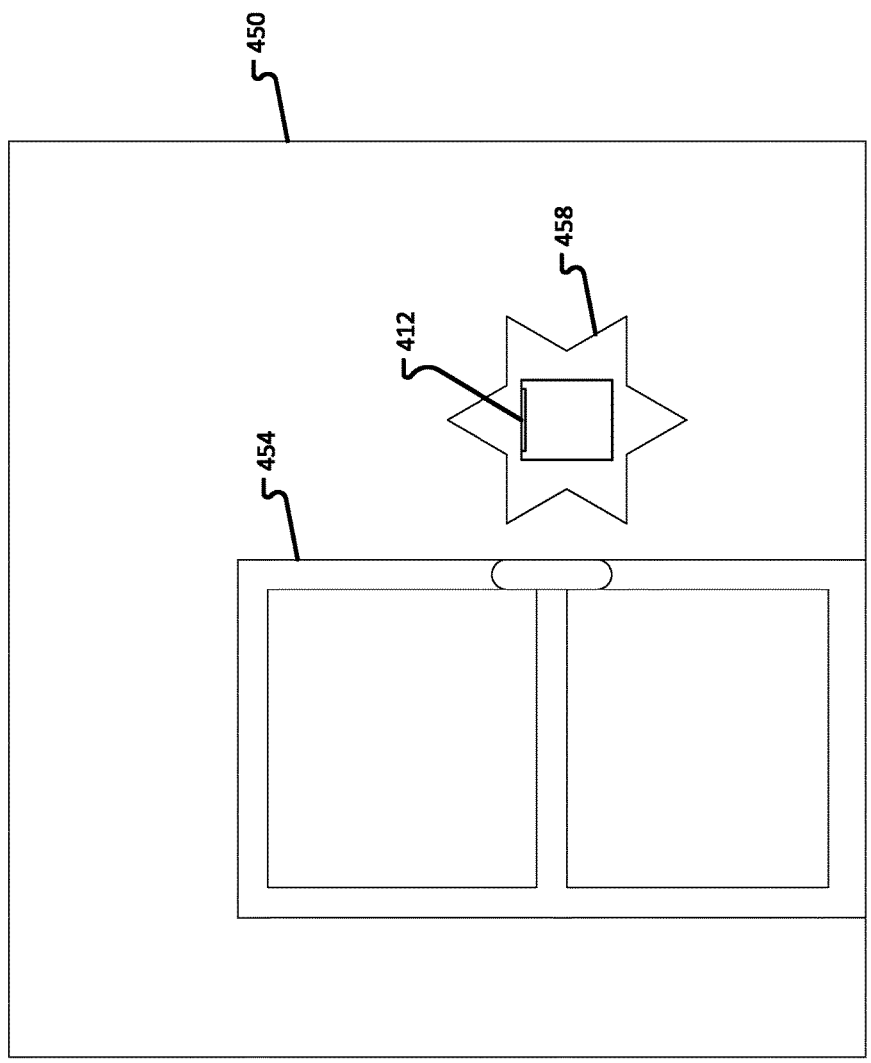
FIG. 4 is a diagram depicting a recipient device of an access control system in accordance with some embodiments of the present disclosure.
Figure 5A:
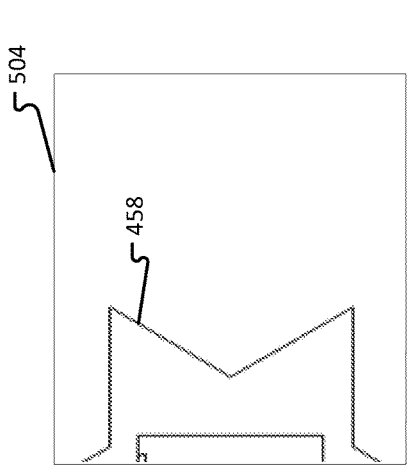
FIG. 5A depicts a first image of a portion of a fixed object as taken by a camera of a mobile device in accordance with one embodiment of the present disclosure.
Figure 5D:
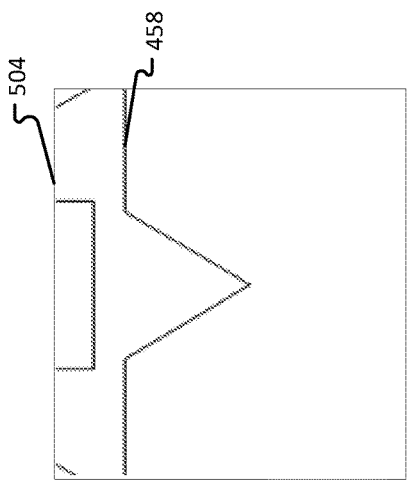
FIG. 5D depicts a fourth image of a portion of a fixed object as taken by a camera of a mobile device in accordance with embodiment of FIG. 5A.
Figure 5B:
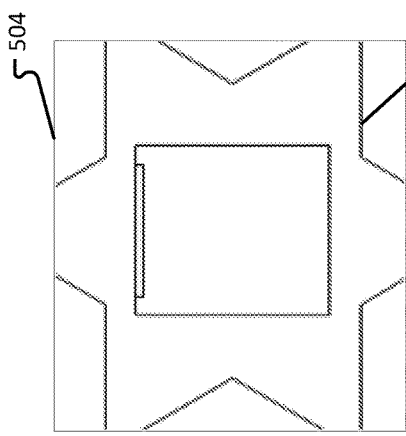
FIG. 5B depicts a second image of a portion of a fixed object as taken by the camera of the mobile device in accordance with embodiment of FIG. 5A.
Figure 5E:
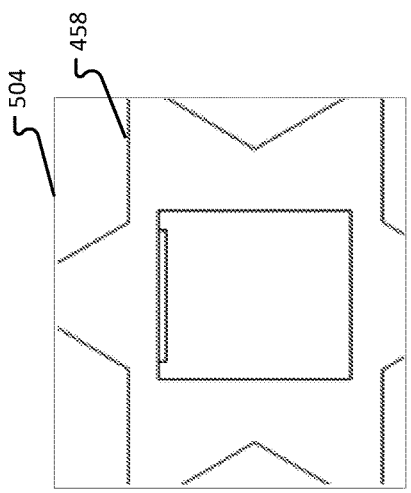
FIG. 5E depicts a fifth image of a portion of a fixed object as taken by a camera of a mobile device in accordance with embodiment of FIG. 5A.
Figure 5C:
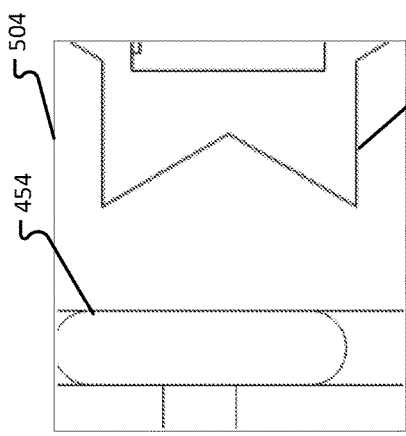
FIG. 5C depicts a third image of a portion of a fixed object as taken by a camera of a mobile device in accordance with embodiment of FIG. 5A.
Figure 5F:
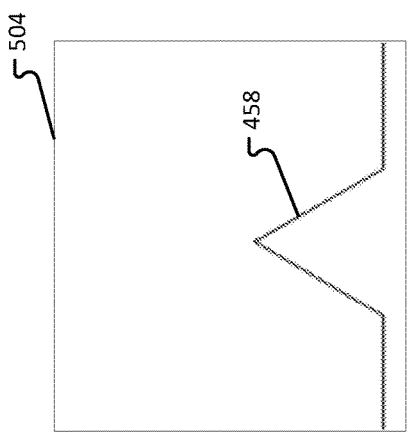
FIG. 5F depicts a sixth image of a portion of a fixed object as taken by a camera of a mobile device in accordance with embodiment of FIG. 5A.

Referring now to FIG. 3, a communication system according to some embodiments of the present disclosure may include a mobile device 308 (e.g. a smart phone, tablet, wearable computing device, etc.) equipped with a wireless communication radio 332 and having a camera 340, an analysis module 316 configured to analyze input from the camera 340 (including at least a processor 216), and a memory 304 in which sensitive information 312 and instructions 310 are stored. The mobile device 308 may also include any of the components of the mobile device 108, and indeed is shown in FIG. 3 to include a user interface 224, a reader interface 228, a power module 236, and driver(s) 220.

Like the memory 204, the memory 304 of the mobile device 308 may correspond to any type of non-transitory computer-readable medium. In some embodiments, the memory 304 may comprise volatile or non-volatile memory and a controller for the same. Non-limiting examples of memory 304 that may be utilized in the mobile device 308 include RAM, ROM, buffer memory, flash memory, solid-state memory, or variants thereof. Additionally, the memory 304 stores instructions 310 for execution by the processor 216. The instructions 310 cause the processor 216 to execute the various steps described herein with respect to the present embodiment, although in other embodiments the instructions 310 cause the processor 216 to execute the various steps included in the other embodiments. The instructions may be grouped together into one or more modules, processes, features, functions, objects, or other groupings that each relate to a specific task or step.

The analysis module 316 is configured to receive information from the camera 340 and, using the processor 216, to analyze such information so as to determine whether to allow the sensitive information 312 to be communicated via the wireless communication radio 332 or some other communication means. Although the analysis module 316 is depicted separately from the memory 304 in FIG. 3, the analysis module 316 may include some or all of the memory 304, including some or all of the instructions 310 stored in the memory 304. Alternatively, the analysis module 316 may include its own dedicated memory separate and apart from the memory 304, and may store in such dedicated memory specific instructions for use in analyzing information received from the camera 340 and/or from other sources and in determining whether to allow the sensitive information 312 to be communicated beyond the mobile device 308.

The wireless communication radio 332 may be any radio that allows the mobile device 308 to communicate wirelessly, e.g. with other mobile devices and/or with one or more readers of an access control system. The wireless communication radio 332 may be configured for communications using any suitable communication protocol or channel, including, for example, any one or more of Bluetooth, Bluetooth low energy (BLE), WiFi, ZigBee, 3G, 4G, CDMA, GSM, and the like.

The camera 340 may be a camera that is built into the mobile device 308, or it may be a camera that is in wired or wireless communication with the mobile device 308 (e.g. via an accessory port or via a Bluetooth connection). The camera 340 may be a color camera or a black-and-white camera. The camera 340 may be capable of detecting light in spectra that are not visible to the human eye, in addition to or instead of light in the visible spectrum. The camera 340 may be capable of taking still images, video images, or both.

Referring now to FIGS. 4 and 5A-5F, in some embodiments, a protected resource 450 may have a door 454 controlled by an access control system having a reader 412. A mobile device 308 is configured such that its sensitive information 312 may be transmitted over a wireless connection (e.g. via the wireless communication radio 332) to the reading device 412 only when the analysis module 316 detects, based on input (e.g. one or more still images or a video feed) from the camera 340, a predetermined motion or sequence of motions. The reading device 412 is surrounded by a star-shaped fixed object 458 that can be used by the mobile device 308 to assist in evaluating motion. For example, the analysis module 316 may be configured to detect a predetermined motion or sequence of motions by recognizing movement of the fixed object 458 within the field of view of the camera 340 relative to one or more borders 504 of the image(s) taken by the camera 340 (and thus relative to the mobile device 308). For example, FIGS. 5A-5F depict images that might be taken by a camera 340 of a mobile device 308 as the mobile device is moved from left to right (FIGS. 5A-5C) and then from top to bottom (FIGS. 5D-5F) of the fixed object 458. Once the analysis module 316 of the mobile device 308 determines that the mobile device 308 has completed that motion sequence, the analysis module 316 may compare the completed motion sequence to a predetermined motion sequence to determine whether the completed sequence matches the predetermined sequence, and may then make a determination, based on the comparison, that sensitive information 312 stored in the memory 304 of the mobile device 308 may be communicated to another device (e.g. to the reading device 412) via the wireless communication rate 332.

As persons of ordinary skill in the art will recognize based on the foregoing disclosure, where a predetermined motion or sequence of motions (of the mobile device 308) is required to release the sensitive information 312 for communication by the wireless communication radio 332, the mobile device 308 (via the analysis module 316 and/or the camera 340) may utilize any object in one or more images captured by the camera 340 to determine whether the mobile device 308 has moved in the predetermined motion or sequence of motions. For example, the reading device 412 may be used to analyze motion of the mobile device 308 in the same manner described above with respect to the fixed object 458, which would negate the need for a fixed object 458. However, as an additional measure of security, the analysis module 316 may be configured to require not just movement of the mobile device 308 in the predetermined motion or sequence of motions, but also that a predetermined object appear in one or more images taken by the camera 340. Thus, with reference again to FIGS. 4 and 5A-5F, a mobile device 308, and in particular an analysis module 316 of the mobile device 308, may be configured to make a determination to release the sensitive information 312 for communication only if the fixed object 458 is detected in one or more images taken by the camera 340. This requirement may be instead of or in addition to the requirement that the mobile device 308 be moved in a predetermined motion or sequence of motions. As persons of ordinary skill in the art will further recognized based on this disclosure, a requirement that the mobile device be moved in a predetermined motion or sequence of motions is a requirement that tests the knowledge of the user of the mobile device 308 (e.g. to determine whether the user is authorized), while a requirement that a particular fixed object (here, fixed object 458) appear in an image captured by the camera 340 is a requirement that provides at least one way to verify the authenticity of the recipient device (here, the reader 412).

In embodiments, the analysis module 316 may automatically select the fixed object 458 for use in analyzing relative motion of the mobile device 308, or user input may be required to identify and select the fixed object 458. While FIGS. 4 and 5A-5F depict a star-shaped fixed object 458, the fixed object may, but need not, be an edge, any 2D or 3D shape, a face, or a pattern. As persons of ordinary skill in the art will recognize, means for automatically identifying edges, faces, and other objects in a camera image are well known.

Additionally, a fixed object for purposes of the present disclosure may be any object in an image that is useable for purposes of detecting motion of the camera (and thus of the mobile device) relative to the object, or it may be a predetermined, unique or semi-unique, non-naturally occurring object. In the latter instance, the predetermined object may be one that is unlikely to appear anywhere other than on or in close proximity to a trusted recipient device (e.g. the reader 412), so as to ensure that transmission of the sensitive data 312 occurs only in the presence of a trusted recipient device.

Figure 7:
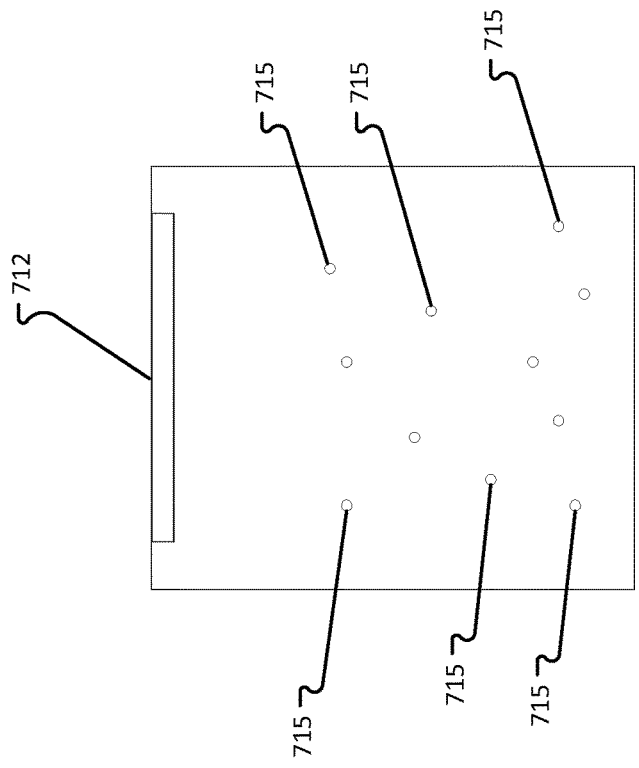
FIG. 7 depicts a recipient device according to other embodiments of the present disclosure.
Figure 6:
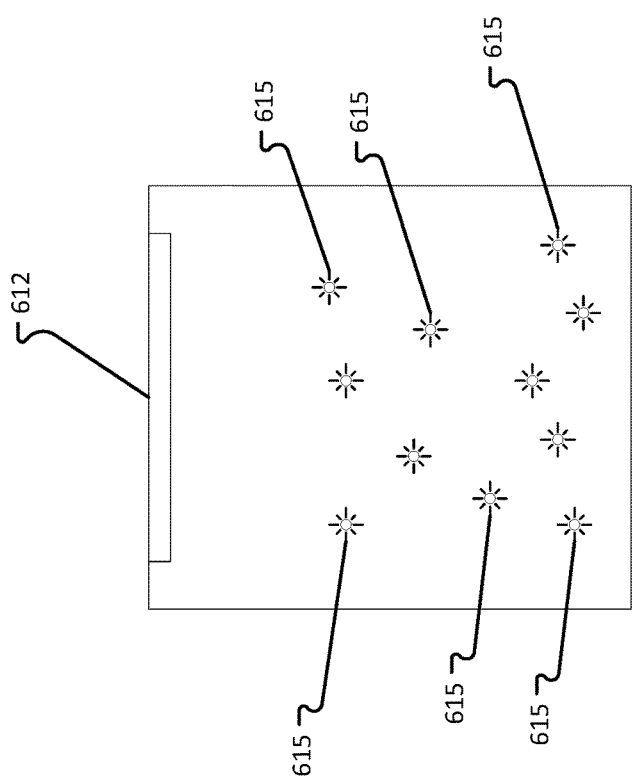
FIG. 6 depicts a recipient device according to some embodiments of the present disclosure.

Turning now to FIGS. 6-7, according to other embodiments of the present disclosure, a predetermined fixed object may be a pattern of electromagnetic radiation, whether in the visible or non-visible spectrum. As a non-limiting example, a trusted recipient device 612 may be configured with a plurality of visible lights 615 useable as a fixed object for the purposes described above. Thus, a mobile device 308 having a camera 340 may be used to obtain an image of the reading device 612, and the analysis module 316 can determine whether the plurality of visible lights 615 in the image matches a predetermined pattern stored in the memory 304. The plurality of visible lights 615 may be arranged in a random pattern, a semi-random pattern, or in a non-random pattern. As another non-limiting example, a trusted recipient device 712 may be configured with a plurality of non-visible lights 715 (i.e. infrared lights) that can still be detected by a camera or other light sensor. In some embodiments, the non-visible lights 715 may be located behind a window that is transparent to the non-visible lights but opaque to visible light, to prevent unauthorized detection—and thus potential unauthorized replication—of the light pattern.

A predetermined motion relative to a fixed object such as the fixed object 458 or to the pattern of lights 615 or 715 in FIGS. 6-7, according to some embodiments of the present disclosure, may be any motion that the analysis module 316 can detect using the camera 340 and the analysis module 316. For example, the predetermined motion may be a simple in-plane rotation (e.g. a 90° rotation clockwise or counterclockwise, such that the fixed object remains in the field of view of the camera 340), or it may be a simple in-plane translation (whether vertical, horizontal, or some combination thereof). Alternatively, the predetermined motion may be more complex, involving out-of-plane translation, out-of-plane rotation, or some combination of translation and rotation, whether in-plane, out-of-plane, or both. A predetermined sequence of motions may be any sequence involving some combination of translation and rotation, and/or out-of-plane translation or rotation.

In some embodiments, the analysis module 316 is configured to allow transmission of sensitive information 312 stored in a mobile device 308 only after verifying that an object in an image taken by the camera 340 is a trusted recipient device. For example, the analysis module 316 may be configured to determine whether an object in an image has one or more particular identifying features (e.g. a logo, a pattern of lights (whether in the visible or non-visible spectrum), a bar code, a shape, a character or sequence of characters, etc.) or a particular combination of identifying features.

In some embodiments, the analysis module 316 is configured to permit transmission of the sensitive information 312 stored in the mobile device 308 to a trusted recipient device (e.g. the reading device 412) only if the mobile device 308 is within a predetermined proximity to the trusted recipient device. In such embodiments, the analysis module 316 may be further configured to determine the proximity of the mobile device 308 to the trusted recipient device using information from an image of the trusted recipient device taken by the camera 340. For example, the analysis module 316 may utilize information about the camera 340, including, without limitation, one or more of the camera's resolution, the camera's focal length, the width (in pixels) of a trusted recipient device in the camera image, and/or the actual size of the trusted recipient device to determine the distance (whether actual or approximate) from the camera 340 to the trusted recipient device. Alternatively, the analysis module 316 may compare information about the width (in pixels) of a trusted recipient device in an image from the camera 340 with information about an acceptable range of widths (in pixels), or about a minimum width (in pixels), of the trusted recipient device, to determine whether the camera 340 is within an acceptable distance from the trusted recipient device. As another alternative within the scope of the present disclosure, the analysis module may receive data from the camera 340 about an image taken by or seen through the camera (i.e. exchangeable image file format data), and such data may indicate the distance from the camera 340 to the trusted recipient device.

Figure 8:
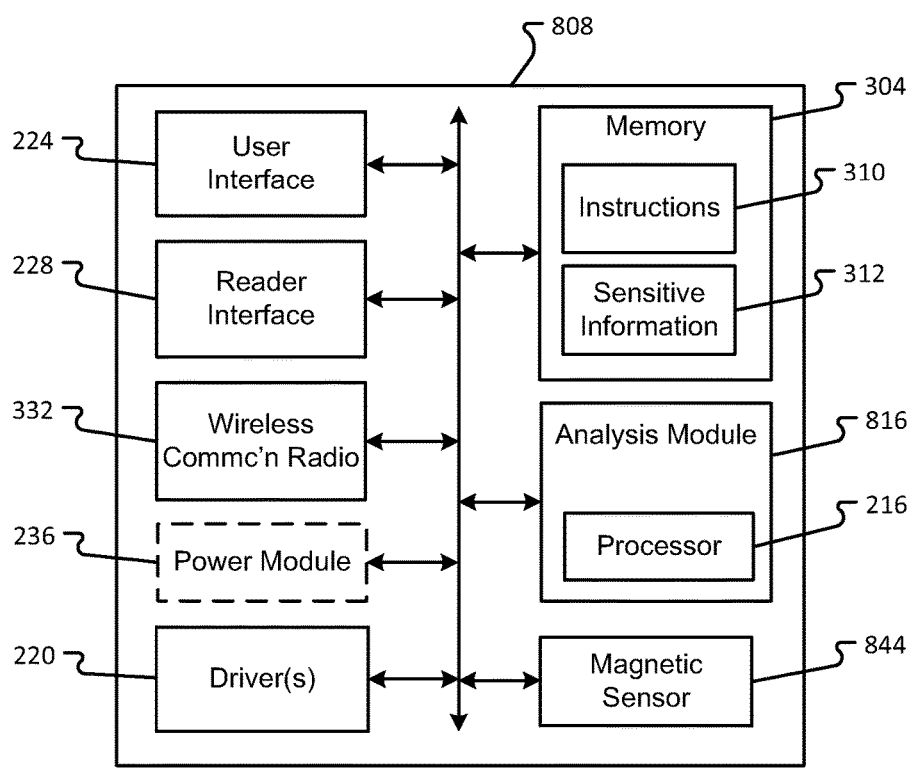
FIG. 8 is a block diagram depicting a mobile device or components thereof in accordance with yet another embodiment of the present disclosure.
Figure 9:
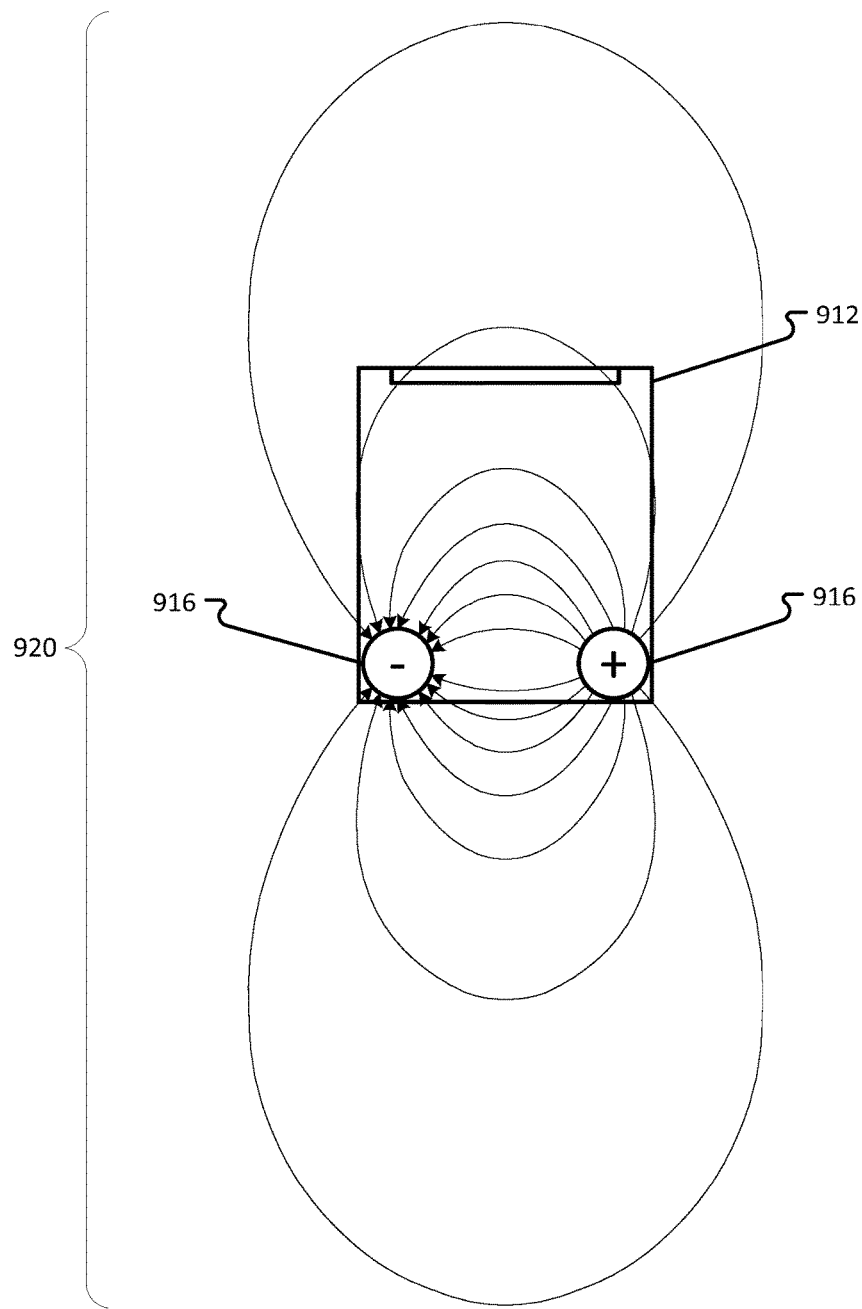
FIG. 9 is a diagram showing portions of a magnetic field surrounding a recipient device according to some embodiments of the present disclosure.

According to other embodiments of the present disclosure, and referring to FIGS. 8-9, a communication system may include a mobile device 808 (e.g. a smart phone, tablet, wearable computing device, etc.) equipped with many of the same components as the mobile device 308, including the wireless communication radio 332 and the memory 304 storing sensitive information 312 and instructions 310. Unlike the mobile device 308, however, the mobile device 808 comprises an analysis module 816 configured to analyze data from a magnetic sensor 844. The analysis module 816 includes at least a processor 216.

In some embodiments, the analysis module 816 is configured to permit transmission of the sensitive data 312 from the mobile device 808 only when the magnetic sensor 844 detects a recognized magnetic field. In such embodiments, a trusted recipient device 912 may be equipped with magnets 916 generating a particular magnetic field 920, and the analysis module 316 may be configured to compare data about the particular magnetic field 920 sensed by the magnetic sensor 844 with data (stored, for example, in the memory 304) about the known magnetic field. In embodiments, the magnets 916 may be arranged in a particular way so as to create a unique or at least semi-unique magnetic field. The magnets 916 may be of the same magnetic strength or of differing magnetic strengths. If the analysis module 816 determines that the sensed magnetic field 920 is identical or sufficiently similar to the known magnetic field of the trusted recipient device (data regarding which is stored, e.g., in the memory 304), then the analysis module 816 allows transmission of the sensitive information 312 from the mobile device 808.

In some embodiments, the mobile device 808 is configured such that the sensitive information 312 may be transmitted over a wireless connection only when the analysis module 816 detects, using input from the magnetic sensor 844, a predetermined motion or sequence of motions. For example, a trusted recipient device 912 may be equipped with one or more magnets 916 that create a detectable magnetic field 920 around the trusted recipient device 912. As the mobile device 808 moves within that magnetic field 920, the magnetic sensor 844 on the mobile device 808 detects changes in the sensed magnetic field and provides data about the changes to the analysis module 816. The analysis module 816, in turn, utilizes the data from the magnetic sensor 844 to determine whether the mobile device 808 has been moved in a way that matches the predetermined motion or sequence of motions and, if so, allows the transmission of the sensitive data 312 from the mobile device 808.

In other embodiments, the analysis module 816 may be configured to allow the transmission of the sensitive information 312 from the mobile device 808 only if it determines, using data received from the magnetic sensor 844, that the mobile device 808 is within a magnetic field, or that the mobile device 808 is within a magnetic field of sufficient strength. This requirement may be met, for example, when the mobile device 808 is within sufficient proximity to the trusted recipient device 912. Moreover, as persons skilled in the art will recognize, embodiments using a magnetic sensor 844 to detect a known magnetic field, or to detect a predetermined motion or sequence of motions, inherently require that the mobile device 808 be within sufficient proximity of a trusted recipient device 912 to detect the magnetic field 920 generated by or around the trusted recipient device 912.

An analysis module of a mobile device according to the present disclosure may, in some embodiments, be configured to accomplish two or more of the tasks described herein. Also, a mobile device within the scope of the present disclosure may include a camera and a magnetic sensor, and the analysis module may be configured to allow transmission of sensitive information from the mobile device only if a combination of requirements is satisfied, including at least one requirement that involves the magnetic sensor and at least one requirement that involves the camera.

In some embodiments, the analysis module of a mobile device may comprise a set of software instructions packaged in an app that is stored in the memory of the mobile device. The app may be configured to obtain information from a magnetic sensor and/or a camera on the mobile device, and to use the processor of the mobile device to analyze the information and determine whether to allow the mobile device to transmit sensitive data stored therein. In some embodiments, a user of the mobile device initiates the app only when the user needs to transmit sensitive information stored on the mobile phone, while in other embodiments, the app runs constantly on the mobile device. In various embodiments, the app is configured to activate the camera and/or the magnetic sensor of the mobile device only when the app itself is initiated or only upon receiving a predetermined input. As one non-limiting example, the app may be configured to constantly receive and analyze information from the magnetic sensor, and to initiate the camera only when the information from the magnetic sensor meets a predetermined requirement, such as when the information includes data about a sensed magnetic field that matches a predetermined magnetic field, or reflects a predetermined movement or sequence of movements within a magnetic field.

Alternatively, in some embodiments the analysis module of a mobile device may be a set of software instructions included in the operating system of a mobile device, or it may be a chip within a mobile device having one or more of its own memory, processor, magnetic sensor, camera, and power supply. Such embodiments may be implemented, for example, to provide improved security for sensitive information stored in a memory of the analysis module, or to reduce or eliminate use of the mobile device's primary power source, or to ensure that the analysis module can still function when the mobile device's primary power source is depleted.

Figure 10:
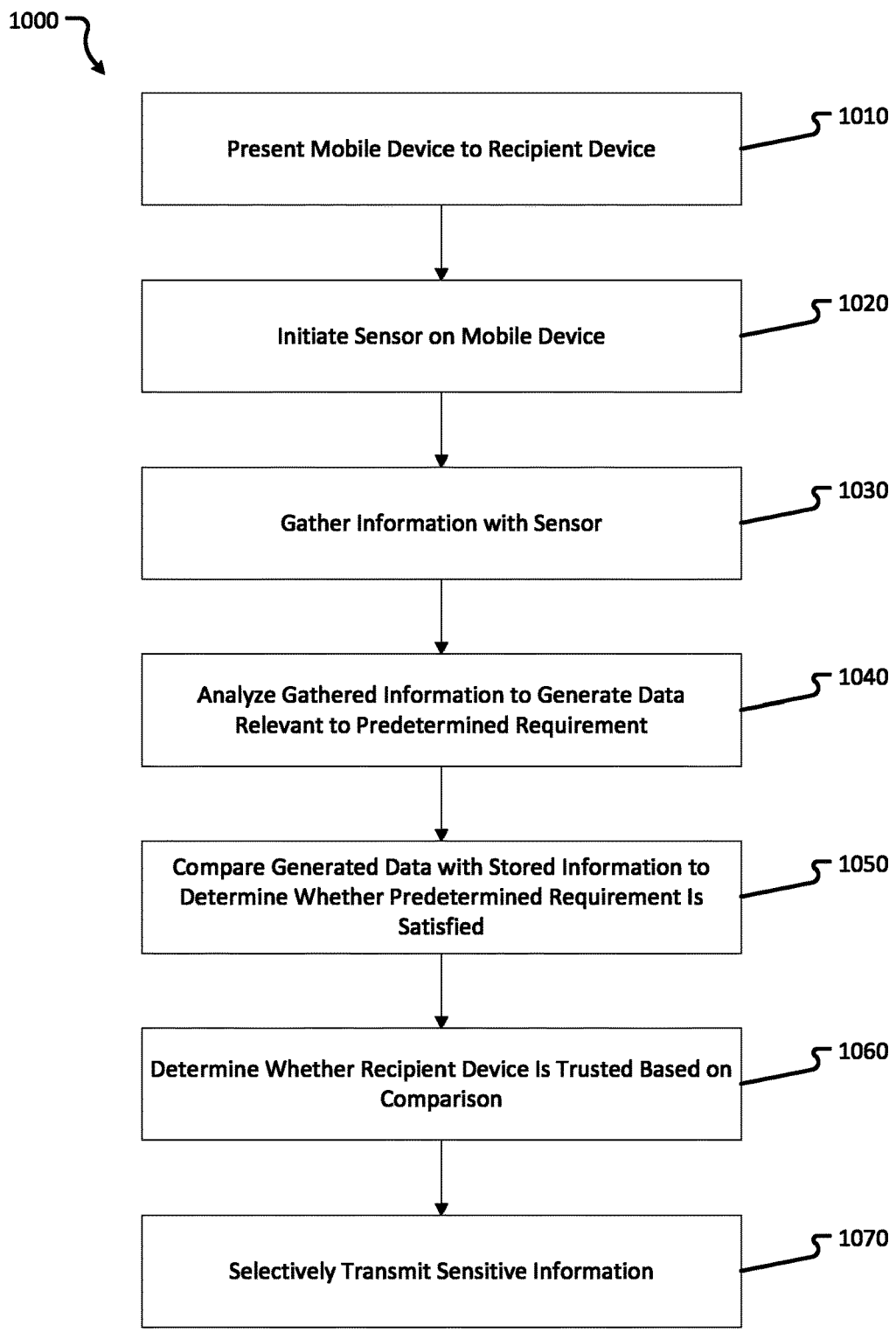
FIG. 10 is a flowchart depicting a method according to some embodiments of the present disclosure.

Referring now to FIG. 10, a method 1000 according to embodiments of the present disclosure includes a step 1010 of presenting a mobile device, such as the mobile device 308, 408, or 808, to a recipient device, such as a reader 412 or 912 (although the recipient device may be another mobile device, or a device that is not associated with an access control system). The presentation may comprise, for example and without limitation, one or more of placing or otherwise moving the mobile device within communication range of the recipient device, tapping the mobile device on the recipient device, and manipulating a user interface of the mobile device so as to indicate to the mobile device that the user would like to transmit the sensitive information stored thereon to a recipient device. The presentation may or may not require user interaction with the mobile device. In some embodiments, for example, the mobile device may periodically broadcast signals and listen for a response from a recipient device. Thus, presentation of the mobile device to the reader may comprise receipt of a response to such a signal. In other embodiments, the recipient device may periodically broadcast signals and listen for a response from a mobile device. Thus, transmission of a signal to the recipient device in response to a signal received from the recipient device may constitute presentation of the mobile device to the recipient device. In embodiments, the presentation may require that the mobile device be removed from a pocket, purse, or other compartment in which it is normally kept, or the presentation may occur while the mobile device is secured within a pocket, purse, or other compartment.

The method 1000 also includes a step 1020 of initiating a sensor on the mobile device. The initiated sensor may be an optical sensor or a magnetic sensor. In some embodiments, both an optical sensor and a magnetic sensor may be initiated. The sensor may be built into the mobile device, or it may be attached to the mobile device as a peripheral or accessory device. The initiating may happen automatically upon the presentation of the mobile device to the recipient device. For example, the mobile device may be configured with instructions stored in memory that cause the processor to initiate the sensor as soon as a presentation of the mobile device to the recipient device is detected. Alternatively, initiating the sensor may require user interaction with the mobile device. In some embodiments, for example, a user may open an app on the mobile device (whether as part of the presenting step 1010 or as part of the initiating step 1020), and select an option that results in initiation of the sensor.

In step 1030 of the method 1000, the sensor gathers information for use in determining whether the recipient device is a trusted recipient device. The gathered information may include, for example, one or more still or video images, whether of visible electromagnetic radiation or invisible (to the human eye) electromagnetic radiation. Alternatively, the information may include, for example, information about magnetic field strength or direction, whether at a single time, at multiple times, or over a period of time. The user of the mobile device may manipulate the mobile device during the step 1030, including by rotating, translating, or otherwise moving the mobile device in a predetermined motion or sequence of motions, or the user may not manipulate the mobile device during the step 1030. Manipulation of the mobile device may not be necessary, for example, if the mobile device is equipped with a magnetic sensor that need only measure the magnetic field surrounding the mobile device. Whether or not the user manipulates the mobile device by moving it or otherwise during the step 1030, the user may remove the mobile device from a pocket, purse, or other storage compartment during the step 1030, for example so that the optical sensor of the mobile device can obtain an image, or so a magnetic sensor of the mobile device can accurately sense a surrounding magnetic field.

The method 1000 also includes the step 1040 of analyzing the information gathered by the sensor to generate data relevant to a determination of whether a predetermined requirement has been satisfied. As discussed in greater detail above, the predetermined requirement may relate to, by way of example and without limitation, movement of the mobile device in a predetermined motion or sequence of motions relative to a fixed object or a magnetic field; identification of a predetermined fixed object in an image; identification of a predetermined pattern of lights in an image; the distance between the mobile device and the recipient device; identification of a known or recognized magnetic field; the strength of the magnetic field surrounding the mobile device; or any combination of the foregoing. Thus, the generated data may be, for example and without limitation, data about the movement of the mobile device, data about one or more fixed objects or magnetic fields sensed by the sensor; data about a pattern of lights; and data about a distance between the mobile device and a recipient device. The generated data may be calculated based on the gathered information; measured based on the gathered information; inferred based on the gathered information and according to a set of inference rules; or any combination of the foregoing. Additionally, the generated data may include one or more portions of the gathered information.

Step 1050 of the method 1000 comprises comparing, with a processor of the mobile device, the generated data with information stored in the memory of the mobile device to determine whether the predetermined requirement has been satisfied. For example, if the predetermined requirement is that a magnetic field surrounding the mobile device be of a particular strength, then generated data about the strength of the sensed magnetic field is compared with information stored in the memory of the mobile device about the minimum required magnetic field strength. Similarly, if the predetermined requirement is that a certain fixed object be in an image captured by the sensor of the mobile device, then generated data about the one or more fixed objects in images gathered by the sensor is compared, with a processor, to information stored in the memory of the mobile device about the certain fixed object. Still further, if the predetermined requirement is that the mobile device be moved in a predetermined motion or sequence of motions, then generated data about the movement of the mobile device is compared, with the processor, to information stored in the memory of the mobile device about the predetermined motion or sequence of motions.

The method 1000 further includes the step 1060 of determining, based on the comparison, whether the recipient device is trusted. If the comparison of step 1050 indicates that the predetermined requirement has been met, then the recipient device is determined to be trusted. If the comparison of step 1050 indicates the predetermined requirement has not been met, then the recipient device is determined to not be trusted. In embodiments, if the predetermined requirement has not been met, the mobile device may be configured to allow the user to repeat the method 1000 to obtain another determination of whether the recipient device is trusted, although the mobile device may be configured to limit the number of times that the method 1000 can be repeated within a given period of time. Additionally, the mobile device may be configured with alternate ways of confirming that the recipient device is trusted, such that if the method 1000 does not result in a determination that the recipient device is trusted, the user can satisfy other requirements not related to the method 1000 in an attempt to verify that the recipient device is trusted.

The method 1000 concludes with the step 1070, in which the mobile device selectively transmits the sensitive information stored thereon to the recipient device based on the determination. If the determination of step 1060 is that the recipient device is trusted, then the mobile device transmits the sensitive information to the recipient device. If the determination of step 1070 is that the recipient device is not trusted, however, then the mobile device does not transmit the sensitive information to the recipient device. In embodiments, the mobile device may activate a switch as part of the step 1070, where the switch either places the memory of the mobile device in which the sensitive information is stored in communication with the wireless communication radio, or interrupts the line of communication between the memory where the sensitive information is stored and the wireless communication radio.

The exemplary systems and methods of this disclosure have been described in relation to mobile devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet other embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A method for authorizing wireless communications from a mobile device to a recipient device of an access control reader, comprising:

receiving, at a processor of the mobile device having sensitive information stored in a computer readable memory thereof, from a magnetic sensor of the mobile device, a signal corresponding to a detected sequence of motions of the mobile device within a magnetic field detected by the magnetic sensor, the detected sequence of motions occurring once the mobile device is within a predetermined proximity to the recipient device generating the magnetic field;

analyzing the signal, with the processor, to determine if the detected sequence of motions correlates to a predetermined mobile device sequence of motions requirement, the analyzing the signal comprising generating magnetic field data corresponding to the detected sequence of motions of the mobile device within the predetermined proximity to the recipient device;

determining, with the processor and based on the generated magnetic field data, whether the detected sequence of motions of the mobile device within the predetermined proximity to the recipient device satisfies the predetermined mobile device sequence of motions requirement, the determining comprising comparing the magnetic field data corresponding to the detected sequence of motions of the mobile device with predetermined magnetic field information stored in the computer readable memory, wherein the magnetic field information comprises information about a magnetic field direction; and selectively transmitting, based on the determination, the sensitive information from the mobile device using a wireless communication protocol.

2. The method of claim 1, wherein the magnetic sensor is a magnetometer.

3. The method of claim 1, wherein the signal comprises information about a strength or direction of the magnetic field.

4. The method of claim 3, wherein the signal comprises information about a strength or direction of the magnetic field at a first time and information about the strength or direction of the magnetic field at a second time later than the first time.

5. The method of claim 1, wherein the access control reader comprises a physical access control reader configured to protect a physical asset.

6. The method of claim 1, further comprising establishing a communication channel with the recipient device of the access control reader, and wherein the sensitive information is selectively transmitted from the mobile device to the recipient device via the communication channel.

7. The method of claim 1, wherein the magnetic field data comprises information about a change in direction of the sensed magnetic field.

8. The method of claim 1, wherein the magnetic field data comprises a distance between the magnetic sensor and a source of the magnetic field.

9. A wireless communication device comprising:
a wireless communication radio;
a magnetic sensor;
a processor; and
a memory containing sensitive information and instructions for execution by the processor, the instructions, when executed, causing the processor to:
obtain data from the magnetic sensor corresponding to a detected sequence of motions of the wireless communication device within a magnetic field detected by the magnetic sensor, the detected sequence of motions occurring once the wireless communication device is within a predetermined proximity to a recipient device generating the magnetic field;
generating, based on the obtained data, magnetic field data corresponding to the detected sequence of motions of the wireless communication device within the predetermined proximity to the recipient device;
determine, based on the generated magnetic field data, whether the detected sequence of motions satisfies a predetermined wireless communication device sequence of motions requirement, the determining comprising comparing the generated magnetic field data corresponding to the detected sequence of motions of the wireless communication device with predetermined magnetic field information stored in the memory, the magnetic field information comprising information about a magnetic field direction; and
allow transmission of the sensitive information to the recipient device, using the wireless communication radio, if the predetermined wireless communication device sequence of motions requirement has been satisfied.

10. The wireless communication device of claim 9, wherein the magnetic sensor is a magnetometer.

11. The wireless communication device of claim 9, wherein the obtained data comprises information about a strength or direction of the detected magnetic field.

12. The wireless communication device of claim 11, wherein the recipient device comprises a physical access control reader configured to protect a physical asset.

13. The wireless communication device of claim 11, wherein the obtained data comprises first information about a strength or direction of the detected magnetic field at a first time and second information about the strength or direction of the detected magnetic field at a second time later than the first time.

14. The wireless communication device of claim 9, wherein the instructions, when executed, further cause the processor to establish a communication channel with the recipient device, and further wherein the allowing transmission comprises allowing transmission via the communication channel.

15. The wireless communication device of claim 14, wherein the magnetic field data comprises information about a direction of the detected magnetic field.

16. The wireless communication device of claim 9, wherein the predetermined magnetic field information stored in the memory comprises one or more features of a known magnetic field.

17. The wireless communication device of claim 9, wherein the determining comprises determining from the obtained data a distance between the magnetic sensor and the recipient device.

18. A system, comprising:
a processor;
a magnetic sensor; and
a memory, the memory storing sensitive information and instructions for execution by the processor that, when executed by the processor, cause the processor to:
detect, by the magnetic sensor, a magnetic field;
detect, by the magnetic sensor and while the magnetic sensor is within a predetermined proximity to a recipient device generating the magnetic field, a sequence of motions of the magnetic sensor relative to the detected magnetic field;
generate, based on data obtained from the magnetic sensor, magnetic field data corresponding to the detected sequence of motions of the magnetic sensor within the predetermined proximity to the recipient device;
evaluate whether the detected sequence of motions of the magnetic sensor corresponds to a predetermined sequence of motions based on information about the predetermined sequence of motions stored in the memory, the evaluating comprising comparing the magnetic field data with magnetic field information stored in the memory, the magnetic field information comprising information about a magnetic field direction; and
selectively transmit, via a wireless communication radio and based on the evaluating, the sensitive information.

19. The method of claim 18, wherein the detecting a magnetic field occurs without user input.

20. The method of claim 18, wherein the predetermined sequence of motions comprises a sequence of motions in a single plane.

* * * * *